July 3, 1956 E. L. C. WHITE 2,753,394

TELEVISION TRANSMISSION SYSTEMS

Filed May 16, 1950

Inventor
ERIC LAWRENCE CASLING WHITE
By Ralph E. Atherton
Attorney

United States Patent Office 2,753,394

Patented July 3, 1956

2,753,394

TELEVISION TRANSMISSION SYSTEMS

Eric Lawrence Casling White, Iver, England, assignor to Electric & Musical Industries Limited, Hayes, England, a British company Application May 16, 1950, Serial No. 162,261

Claims priority, application Great Britain May 19, 1949

3 Claims. (Cl. 178—7.1)

Figure 1:
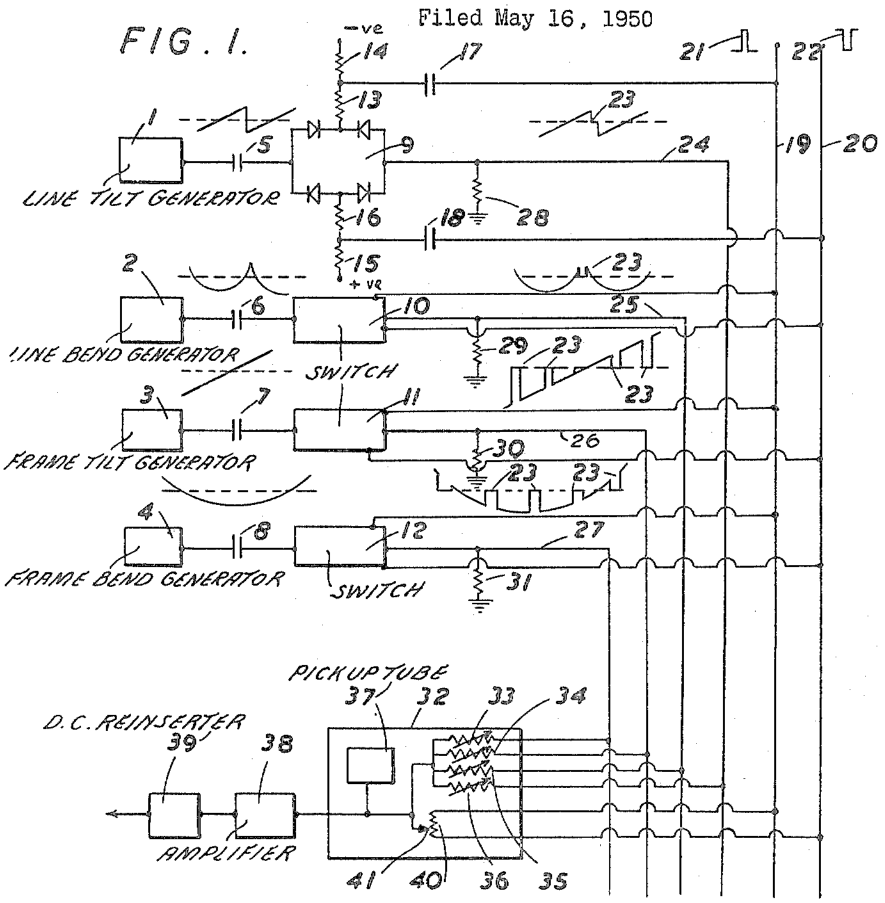

This invention relates to television transmission systems in which it is desired to insert D. C. or low-frequency components which may have become lost due to transmission.

It is well known in television to use a cathode ray television pick-up tube having a target electrode which is scanned by a high-velocity beam to generate picture signals and to interrupt the scanning beam during the period when synchronising pulses are required to be added. It is known that interruption of the scanning beam in such a tube produces a signal which, when the beam is switched off, is related to but not equal to the "average" black of the picture to be transmitted and this relationship is sensibly independent of the picture brightness. The signals produced during the period when the beam is switched off will hereinafter be called the "blacked out" signals. One form of tube which produces such blacked out signals employs a photo-sensitive target screen on to which the optical image is directly projected whilst another form of tube is that described in the specification of U. S. Patent No. 2,244,466 in which the optical image is projected on to a photo-sensitive cathode and an electron image is then projected on to the target electrode. Now although the blacked out signal is related to average black it is not equal to it, the departure depending on the type of tube, the beam current, etc. This difference of level between the blacked out signal and average black will be called the "shift." The average black in the picture signals forms a convenient datum level from which lost D. C. and low-frequency components can be reinserted. In some tubes with a weakly illuminated scene the shift may greatly exceed the picture amplitude.

In the specification of U. S. Patent No. 2,190,753 there is described a method of D. C. reinsertion wherein use is made of the blacked out signal to provide a recurrent reference amplitude in the transmission of television signals.

In the specification of U. S. Patent No. 2,295,330 the difficulties which are discussed in such specification relating to the use of the invention described in patent specification No. 2,190,753 are overcome by adding to the signals prior to the point in the signal channel at which the datum level is stabilised an auxiliary signal which substantially annuls the difference between the reference amplitude and the datum level.

In the pick-up tubes referred to above it is necessary to add to the signals generated by the tube shading signals which usually comprise so-called tilt and bend correction signals as described in U. S. Patent No. 2,166,712. In the specification of U. S. Patent No. 2,295,330 it is stated that after D. C. re-establishment has been effected on the "blacked out" signals any tilt correction signals are added after D. C. re-establishment. When such shading signals are added after D. C. re-establishment the signal amplitude which is required to be handled prior to such addition is considerable and gives rise to amplification difficulties if non-linear distortion is to be avoided. On the other hand, if the shading signals are mixed with the picture signals prior to D. C. re-establishment then since it is necessary to adjust from time to time the shape or amplitude of the shading signals such adjustment would normally cause disturbance of the subsequent D. C. re-establishment owing to the shape of the tips of the blacked out signals varying with the variation of the shading signals.

In other types of pick-up tubes in which the target electrode is stabilised at a potential corresponding to the cathode of the tube, signals are generated when the cathode ray beam is blacked out during scan return periods which bear a relation to true picture black and frequently these signals are employed for D. C. re-insertion purposes.

In some tubes of this type shading signals are also required to be added to the picture signals generated from such tubes and difficulties similar to those referred to above are encountered in that the D. C. re-insertion is disturbed when the amplitude of the shading signals is adjusted.

The object of the present invention is to overcome these difficulties.

In an embodiment of the present invention, the picture signals are caused to assume a fixed level during recurrent intervals whereby the D. C. component of said signals is effectively reinserted and shading signals are mixed with said picture signals prior to the point at which said D. C. component is reinserted, and means are employed for providing said shading signals during said intervals and before they are mixed with said picture signals with portions of fixed level which are unaffected by changes in the amplitude of said shading signals so that adjustment of the amplitude of said shading signals can be made without affecting said D. C. reinsertion.

The shading signals will usually comprise both so-called line and frame tilt and bend correction signals and in one form of the invention said shading signals during the recurrent intervals at which the D. C. component is reinserted are provided with portions of fixed level which exceed the amplitude of said shading signals. Since the shading signals are provided with said portions of fixed level which are unaffected by changes in the amplitude of the shading signals, the shading signals remain at a fixed level during the recurrent intervals when the D. C. component is reinserted and hence any adjustment of the amplitude of the shading signals does not affect the D. C. reinsertion. Where the invention is applied to the aforesaid type of pick-up tube in which the blacked out signals are employed for D. C. reinsertion purposes, the auxiliary signals of adjustable amplitude referred to above which are employed to annul the difference between the reference amplitude and the datum level are superimposed on the portions of fixed levels which are provided in said shading signals.

Figure 2:
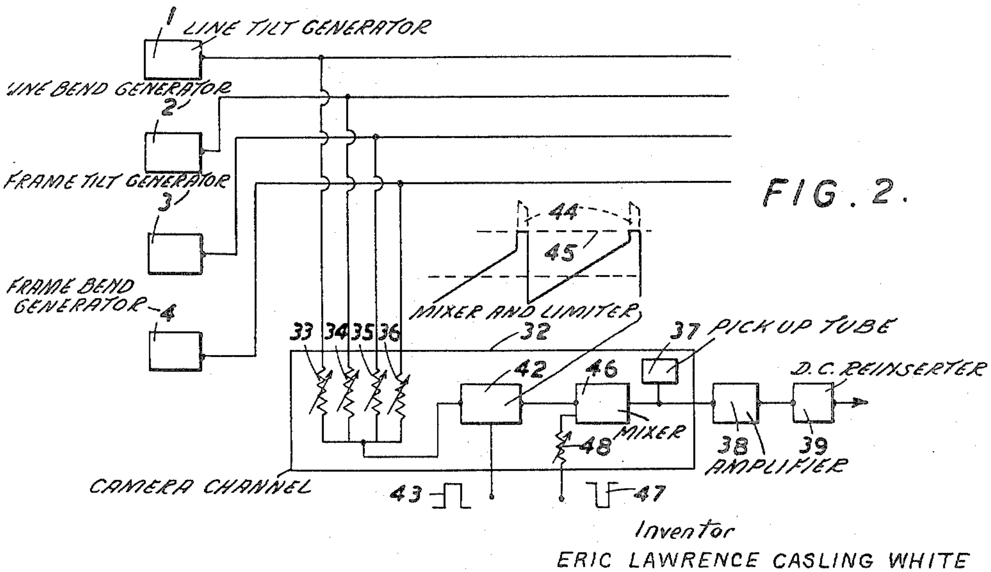

In order that the said invention may be clearly understood and readily carried into effect it will now be more fully described with reference to the accompanying drawings in which:

Figure 1 illustrates a diagrammatic circuit arrangement of a television transmission system and also illustrates various forms of shading signals, and Figure 2 is a diagrammatic circuit arrangement of a television transmission system according to an embodiment of the present invention.

The circuits shown in the drawings are especially suitable for use in connection with television transmission systems in which during scan return periods blacked out signals are generated and auxiliary signals are employed for the purpose of substantially annulling the difference between the reference amplitude and the datum level as referred to above.

The shading signals which are required to be added to the picture signals generated by the pick-up tube comprise the so-called tilt and bend correction signals which are generated at both line and frame frequencies. As shown in Figure 1 the reference numeral 1 indicates a line tilt generator, the reference numeral 2 a line bend generator, the reference numeral 3 a frame tilt generator and the reference numeral 4 a frame bend generator. These generators are well known in the art and require no further description. The waveforms generated by these generators are shown on the right-hand side of each generator, but these waveforms are not drawn to scale. The outputs from these generators are fed through condensers 5, 6, 7 and 8 to switches 9, 10, 11 and 12 only one of which is shown in detail in Figure 1 which as will be observed comprises four diodes. The diodes are connected in the manner shown and are fed through resistances 13 and 14 from a source of negative potential and through resistances 15 and 16 from a source of positive potential, the junction points of the resistances 13, 14 and 15, 16 being connected through condensers 17 and 18 to lines 19 and 20 which are fed respectively with positive and negative pulses indicated at 21 and 22. The pulses 21 and 22 occur at the recurrent intervals when the D. C. component is reinserted and the effect of said pulses on the switches 9, 10, 11 and 12 is that the switches are effectively open-circuited during such periods which, in general, will be the scan return periods so that portions 23 of fixed level are introduced into the shading signals on the occurrence of the pulses 21 and 22, these portions 23 of fixed level occurring at the mean level of the shading signals. The actual circuit connections from lines 19 and 20 are shown only for switch 9, but similar connections for switches 10, 11 and 12 are indicated schematically by solid lines from 19 and 20 to the respective rectangles denoting these other switches. These portions of fixed level are inserted in both the line and frame shading signals and the outputs from the switches 9, 10, 11 and 12 are fed through lines 24, 25, 26 and 27 each connected to earth or other fixed potential through resistances 28, 29, 30 and 31, to a camera channel indicated at 32 including variable resistances 33, 34, 35 and 36 by means of which the amplitude of the shading signals can be adjusted before being mixed with the picture signals generated from a pick-up tube indicated by the rectangle 37. The mixed picture signals and shading signals are then fed to an amplifier 38 and thence to a D. C. reinserting device 39 which may be a clamped D. C. reinserter as described in the specification of U. S. Patent No. 2,190,753. As above mentioned the circuit described is particularly suitable for use in an arrangement in which auxiliary signals are required to be added to blacked out signals and in the circuit shown in Figure 1 these auxiliary signals comprise the pulses 21 and 22, these pulses being fed to a resistance 40 having an adjustable tapping 41 which feeds positive or negative pulse of appropriate amplitude into the mixed picture and shading signals in order to cause the blacked out signals to assume a correct datum value. Since the portions 23 of fixed level are provided in the shading signals it will be appreciated that the amplitude of the shading signals can be varied by adjustment of the resistances 33, 34, 35 and 36 without affecting the level of said portions 23 and since these levels occur at the intervals when D. C. reinsertion is effected adjustment of the amplitude of the shading signals can be made without affecting the D. C. reinsertion. Of course the generators 1, 2, 3 and 4, the generator of the pulses 21 and 22 and the reinserter 37 will all be synchronized in well known manner.

If desired of course instead of introducing the portions 23 into the shading signals before adjustment of their amplitude said portions can be introduced after any required amplitude adjustment has been made. Furthermore the various shading signals can be mixed together and then fed through a single switch, like the switch 9, to introduce said portions 23. The introduction of the portions 23 of fixed level is in principle shown in the U. S. Patent No. 2,244,240.

In the embodiment of the invention shown in Figure 2 of the drawings, instead of introducing into the shading signals the portions 23 which occur at the mean level of the shading signals portions of fixed level are introduced into the shading signals having an amplitude extending beyond the amplitude of the shading signals. For this purpose the outputs of the generators 1, 2, 3 and 4 are fed to the variable resistances 33, 34, 35 and 36 disposed in the camera channel 32, and the shading signals are then fed to a mixer and limiter 42 to which pulses 43 of large amplitude are applied, these pulses occurring during the recurrent intervals at which D. C. reinsertion is to be effected. The amplitude of the pulses 43 is greater than the maximum amplitude of the shading signals so that the amplitude of the mixed signals is as indicated at the dotted lines 44 the mixed signals being then limited at a level indicated by the dotted line 45, such level being greater than the amplitude of the shading signals but less than that of the pulses 43. Thus, the level at which limiting is effected introduces portions of fixed amplitude into the shading signals the level remaining fixed despite variations in the amplitude of the shading signals. The circuit shown in Figure 2 is also particularly suitable where auxiliary signals are required to be added to the blacked out signals and for this purpose the output of the mixer 42 is fed to a further mixer 46 to which pulses 47 forming the auxiliary signals are applied through a variable resistance 48 which enables the amplitude of these pulses to be adjusted before they are superimposed on the portions of the shading signals of fixed level. The output from the mixer 46 is then combined with the picture signals generated from the pick-up tube indicated by the rectangle 37 the combined signals being fed to an amplifier 38 and to a D. C. reinserter 39. The shape of the waveform shown in Figure 2 is purely diagrammatic and is not intended to represent a mixture of the various shading signals. In the arrangement shown in Figure 2 adjustment of the amplitude of the shading signals again does not affect the subsequent D. C. reinsertion.

Although the invention is of particular use in conjunction with television transmission systems in which auxiliary signals are required to allow the difference between a reference amplitude and a datum level, it will be appreciated that the invention is not limited thereto.

What I claim is:

1. A television transmission system comprising a picture signal channel, means for inserting a lost direct-current component at a point in said channel, and at recurrent time intervals; means for generating shading signals; means operable only during said recurrent intervals for modifying the shading signals produced by said generating means by the inclusion with said shading signals of recurrent portions of fixed level greater than the maximum amplitude of the shading signals outside said recurrent intervals, and means for mixing said modified shading signals with the picture signals in said channel at a point prior to the first-named point at which the direct-current components are inserted into the picture signals; whereby only said recurrent portions of fixed level are mixed with the picture signals during the intervals of direct-current component insertion.

2. A television transmission system in accordance with claim 1, in which said means for modifying comprises means for mixing with the shading signals, during said recurrent intervals, pulses of larger amplitude than said shading signals, and means for limiting said mixed pulses and shading signals to provide said recurrent portions of fixed level.

3. A television transmission system according to claim 1 wherein the picture signals contain blacked-out signals, including means for generating auxiliary signals of adjustable amplitude, and means for superimposing said adjustable signals on said portions of fixed level.

References Cited in the file of this patent

UNITED STATES PATENTS

| | | |
|---|---|---|
| 2,166,712 | Bedford | July 18, 1939 |
| 2,190,753 | Brown et al. | Feb. 20, 1940 |
| 2,243,079 | Blumlein et al. | May 27, 1941 |
| 2,244,240 | Blumlein | June 3, 1941 |
| 2,295,330 | Blumlein | Sept. 3, 1942 |
| 2,307,375 | Blumlein et al. | Jan. 5, 1943 |
| 2,404,173 | Hansen | July 16, 1946 |
| 2,445,040 | Schade | July 13, 1948 |